United States Patent
Kamballur Kottayil et al.

(10) Patent No.: US 10,499,084 B2
(45) Date of Patent: Dec. 3, 2019

(54) PIECEWISE-LINEAR INTER-LAYER PREDICTOR FOR HIGH-DYNAMIC RANGE VIDEO CODING

(71) Applicant: DOLBY LABORATORIES LICENSING CORPORATION, San Francisco, CA (US)

(72) Inventors: Navaneeth Kamballur Kottayil, Edmonton (CA); Guan-Ming Su, Fremont, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 36 days.

(21) Appl. No.: 15/765,463

(22) PCT Filed: Oct. 26, 2016

(86) PCT No.: PCT/US2016/058906
§ 371 (c)(1),
(2) Date: Apr. 2, 2018

(87) PCT Pub. No.: WO2017/079007
PCT Pub. Date: May 11, 2017

(65) Prior Publication Data
US 2018/0310027 A1    Oct. 25, 2018

Related U.S. Application Data

(60) Provisional application No. 62/249,779, filed on Nov. 2, 2015.

(30) Foreign Application Priority Data

Dec. 4, 2015    (EP) .................................... 15198037

(51) Int. Cl.
*H04N 19/64*    (2014.01)
*H04N 19/34*    (2014.01)
(Continued)

(52) U.S. Cl.
CPC ......... *H04N 19/647* (2014.11); *H04N 19/117* (2014.11); *H04N 19/126* (2014.11);
(Continued)

(58) Field of Classification Search
CPC ..... H04N 19/187; H04N 19/34; H04N 19/117
See application file for complete search history.

(56) References Cited

U.S. PATENT DOCUMENTS 9,549,207 B2    1/2017    Su
2011/0090959 A1*    4/2011    Wiegand .............. H04N 19/593
375/240.12
(Continued)

FOREIGN PATENT DOCUMENTS

WO    2008/083521    7/2008
WO    2010/100609    9/2010
(Continued)

OTHER PUBLICATIONS

"Optimizing a Tone Curve for Backward-Compatible High Dynamic Range Image and Video Compression"—Zicong Mai ; Hassan Mansour ; Rafal Mantiuk ; Panos Nasiopoulos ; Rabab Ward ; Wolfgang Heidrich. IEEE Transactions on Image Processing ( vol. 20 , Issue: 6, Jun. 2011) (Year: 2011).*
(Continued)

*Primary Examiner* — Mainul Hasan (57) ABSTRACT

In a method to improve the dynamic range of high-dynamic range (HDR) signals using an enhancement layer, a piecewise-linear inter-layer predictor and a residual masking operator are applied. The generation of the piecewise-linear inter-layer prediction function is based on a computed scene-significance histogram based on the average of frame-significance histograms indicating pixel values where coding artifacts are most likely to occur. For each segment in the prediction function, its slope is inversely proportional to a measure of energy in the segment under the scene-significance histogram. Bit rate constrains for the enhancement layer are also taken into consideration in determining the piecewise-linear prediction function.

20 Claims, 3 Drawing Sheets

(51) Int. Cl.
  *H04N 19/159* (2014.01)
  *H04N 19/61* (2014.01)
  *H04N 19/117* (2014.01)
  *H04N 19/132* (2014.01)
  *H04N 19/187* (2014.01)
  *H04N 19/126* (2014.01)
  *H04N 19/136* (2014.01)
  *H04N 19/179* (2014.01)

(52) U.S. Cl.
  CPC ......... *H04N 19/132* (2014.11); *H04N 19/136* (2014.11); *H04N 19/159* (2014.11); *H04N 19/179* (2014.11); *H04N 19/187* (2014.11); *H04N 19/34* (2014.11); *H04N 19/61* (2014.11)

(56) References Cited

U.S. PATENT DOCUMENTS

| | | | | |
|---|---|---|---|---|
| 2013/0108183 | A1* | 5/2013 | Bruls | ............ G06T 9/004 382/233 |
| 2014/0185664 | A1* | 7/2014 | Van Der Auwera | ... H04N 19/50 375/240.02 |
| 2015/0269736 | A1* | 9/2015 | Hannuksela | ......... H04N 13/161 345/419 |
| 2018/0020226 | A1 | 1/2018 | Schueuer | |

FOREIGN PATENT DOCUMENTS

| | | |
|---|---|---|
| WO | 2012/147018 | 11/2012 |
| WO | 2014/107255 | 7/2014 |
| WO | 2015/123067 | 8/2015 |

OTHER PUBLICATIONS

"Tone mapping based on fast image decomposition and multi-layer fusion"—Huameng Fang ; Benshun Yi ; Yongqin Zhang ; Qiuying Xie. IET Computer Vision ( vol. 9 , Issue: 6 , Dec. 2015) (Year: 2015).*

"Piecewise Tone Reproduction for High Dynamic Range Imaging"—Joohyun Lee, Gwanggil Jeon, and Jechang Jeong. IEEE Transactions on Consumer Electronics ( vol. 55 , Issue: 2 , May 2009) (Year: 2009).*

Audio Visual Application Format Specifications for BD-ROM Version 3.0, White paper Blu-Ray Disc Read-only Format (Ultra HD Blu-ray), Blu-Ray Disc Association, Jul. 2015.

* cited by examiner

PIECEWISE-LINEAR INTER-LAYER PREDICTOR FOR HIGH-DYNAMIC RANGE VIDEO CODING

CROSS-REFERENCE TO RELATED APPLICATIONS

This application claims priority to U.S. Provisional Patent Application No. 62/249,779, filed on Nov. 2, 2015 and European Patent Application No. 15198037.2, filed on Dec. 4, 2015, each of which is incorporated herein by reference in its entirety.

TECHNOLOGY

The present invention relates generally to images. More particularly, an embodiment of the present invention relates to a piecewise-linear inter-layer predictor for the coding of images and video sequences with high dynamic range.

BACKGROUND

As used herein, the term 'dynamic range' (DR) may relate to a capability of the human visual system (HVS) to perceive a range of intensity (e.g., luminance, luma) in an image, e.g., from darkest blacks (darks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus while perhaps somewhat narrower in relation to true scene referred HDR, EDR nonetheless represents a wide DR breadth and may also be referred to as HDR.

In practice, images comprise one or more color components (e.g., luma Y and chroma Cb and Cr) wherein each color component is represented by a precision of n-bits per pixel (e.g., n=8). Using linear luminance coding, images where n≤8 (e.g., color 24-bit JPEG images) are considered images of standard dynamic range, while images where n>8 may be considered images of enhanced dynamic range. EDR and HDR images may also be stored and distributed using high-precision (e.g., 16-bit) floating-point formats, such as the OpenEXR file format developed by Industrial Light and Magic.

As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

Most consumer desktop displays currently support luminance of 200 to 300 $cd/m^2$ or nits. Most consumer HDTVs range from 300 to 500 nits with new models reaching 1000 nits ($cd/m^2$). Such conventional displays thus typify a lower dynamic range (LDR), also referred to as a standard dynamic range (SDR), in relation to HDR or EDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 700 nits to 5,000 nits or more). As appreciated by the inventors here, improved techniques for the coding and delivery of high-dynamic range images are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Video coding and delivery of high dynamic range (HDR) images is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to methods for generating a piecewise-linear inter-layer predictor for the video coding and delivery of high-dynamic range images. In an embodiment, a processor accesses a first group of images in a first bit depth and a second group of corresponding images in a second bit depth, wherein the second bit depth is lower than the first bit depth and the first group and second group of images represent the same scene. For at least one image in the second group, a frame-significance pixel map is computed to identify pixels that may exhibit coding artifacts due to the reduced bit depth. A frame-significance histogram is computed for each frame-significance pixel map. Given the computed frame-significance histograms, a scene-significance histogram is computed for the whole second group of pictures. The scene-significance histogram is then used to generate a piecewise linear prediction function, where the slope of each segment in the prediction function is inversely proportional to a measure of energy in the segment under the scene-significance histogram.

In an embodiment, the slopes of the piecewise-linear prediction function are used to determine a masking function for masking pixels values of residual images of an enhancement layer generated using images in the first group of images and predicted images using the prediction function and the second group of images.

In an embodiment, the slope of each segment of the piecewise-linear prediction function may also be adjusted according to bit rate constrains in the enhancement layer.

In an embodiment, the pivot points of each segment in the prediction function are computed based on select peak values of the histogram.

Video Delivery for High Dynamic Range (HDR) Video

According to a recent white paper by the Blu-Ray Disc Association, titled, "*Audio Visual Application Format Specifications for BD-ROM Version 3.0*," White paper Blu-Ray Disc Read-only Format (Ultra HD Blu-ray), Blu-Ray Disc Association, July 2015, which is incorporated herein by reference in its entirety, the proposed Ultra HD Blu-ray standard supports a mandatory single-layer (10-bit, YCbCr 4:2:0) Blu-Ray Disc Movie (BDMV) EDR format (also to be referred as the HDR10 format) and an optional Dolby Vision, dual-layer, HDR format. The Dolby Vision HDR stream is composed by a base layer (BL) BDMV EDR video stream and a Dolby Vision enhancement layer (EL) video stream with associated metadata. A generic Blu-ray decoder will only be able to play back the HDR10 base layer; however, a Dolby Vision-enabled player will be able to combine the base layer and the enhancement layer to generate a 12-bit HDR video output with better dynamic range than the dynamic range of the default HDR10 stream.

Figure 1:
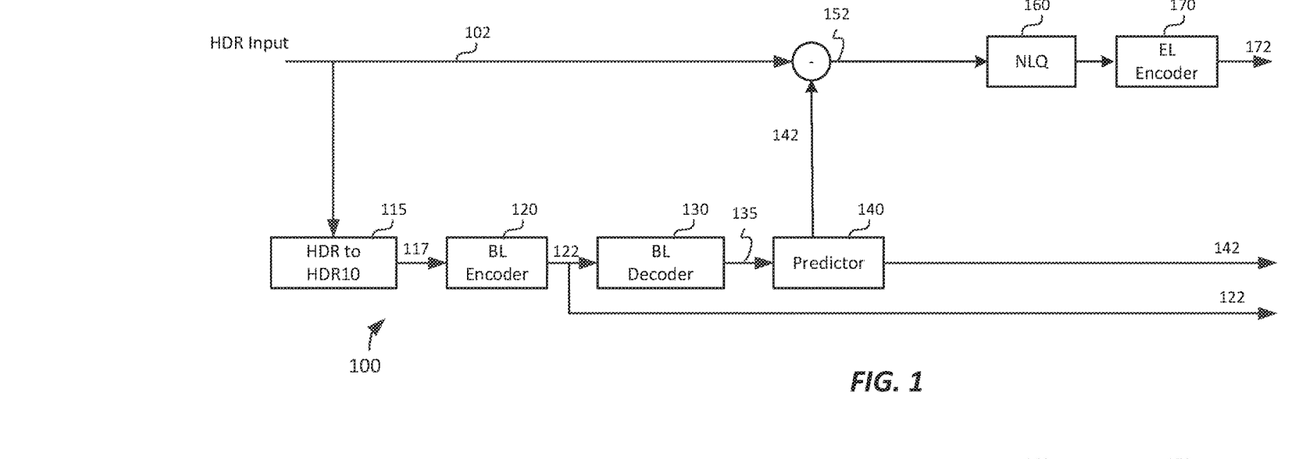
FIG. 1 depicts an example processes for the video delivery of HDR video using a base layer and an enhancement layer.

The Dolby Vision stream is characterized by the following:
BT. 2020 color primaries with non-constant luminance
An EOTF (Electro-optical transfer function) based on SMPTE 2084
A combined BL/EL bit depth of 12 bits FIG. 1 depicts a layered HDR encoder architecture (100) in accordance with an example embodiment. In an embodiment, all video coding in the base and enhancement coding layers may be performed in the YCbCr 4:2:0 color space. HDR image encoder (100) may be implemented by one or more computing devices.

The HDR image encoder (100) is configured to receive a high-resolution (e.g., UHD) input HDR image (102). As used herein, an "input HDR image" refers to an enhanced or high dynamic range image data (e.g., raw image data captured by a high-end image acquisition device and the like) that may be used to derive a HDR version of the input image. The input HDR image (102) may be in any color space that supports a high dynamic range color gamut. In an embodiment, the input HDR image is a 12-bit or higher YCbCr image, which may have been originally in the RGB space. As used herein, for an image with multiple color components (e.g., RGB or YCbCr), the term n-bit image (e.g., 12-bit or 8-bit image) denotes an image where each pixel of its color components is represented by an n-bit pixel. For example, in an 8-bit RGB image, each pixel comprises of three color components, each color component (e.g., R, G, or B) is represented by 8-bits, for a total of 24 bits per color pixel.

Each pixel may optionally and/or alternatively comprise up-sampled or down-sampled pixel values for one or more of the channels in the color space. It should be noted that in some embodiments, in addition to three primary colors such as red, green and blue, different primary colors may be concurrently used in a color space as described herein, for example, to support a wide color gamut; in those embodiments, image data as described herein includes additional pixel values for those different primary colors and may be concurrently processed by techniques as described herein.

HDR to HDR10 (115) converter converts the high bit-depth HDR input (102) to a BL image (117) of lower depth (e.g., a 10-bit image). Typically, it is beyond the scope of any coding standard on how the 10-bit HDR Layer (117) is generated from the original HDR input (102). Some embodiments may use dynamic-range conversion techniques such as those described in PCT Application Ser. No. PCT/US2013/073085, filed on Dec. 4, 2013, also published as WO2014/107255, to be referred as the '085 application, which is incorporated herein by reference in its entirety. In some embodiments, given a 12-bit input HDR (102), the 10-bit HDR10 stream (117) may be generated by a simple truncation of the two least significant bits.

BL image encoder (120) is configured to encode/format the BL image (117) to generate a coded (or compressed) BL image (122). BL encoder may be any of the known video encoders, such as those specified by the ISO/IEC H.264 or HEVC standards, or other encoders, such as Google's VP9 and the like.

BL decoder (130) in the HDR image encoder (100) decodes the image data in the base layer image container into a decoded base layer image (135). Signal 135 represents the decoded BL as will be received by a compliant receiver. The decoded base layer image (135) is different from the BL image (117), as the decoded base layer image comprises coding changes, rounding errors and approximations introduced in the encoding and decoding operations performed by the BL encoder (120) and the BL decoder (130).

Predictor (140) performs one or more operations relating to predicting the HDR input signal (102) based on the decoded BL stream (135). The predictor (140) attempts to implement the reverse of operations performed by the HDR to HDR10 converter (115). Example embodiments of such a predictor are described in the '085 PCT Application. The predictor output (142) is subtracted from the HDR input (102) to generate residual 152.

In an example embodiment, an enhancement layer quantizer (NLQ) (160) in the HDR image encoder (100) is configured to quantize the HDR residual values (152) from a high bit-depth digital representation (e.g., 12 bits) to a lower digital representation (e.g., 10 bits or 8 bits) using an NLQ function determined by one or more NLQ parameters. The NLQ function may be linear, piece-wise linear, or non-linear. An example of non-linear NLQ design is described in the '085 PCT Application.

Enhancement layer (EL) encoder (170) is configured to encode the residual values in an enhancement layer image container to generate the coded EL stream (172). EL encoder (170) may be any of the known video encoders, such as those specified by the ISO/IEC H.264 or HEVC standards, or other encoders, such as Google's VP9 and the like. EL and BL encoders may be different or they may be the same.

The set of parameters used in the predictor (140) and NLQ (160) may be transmitted to a downstream device (e.g., an HDR decoder) as a part of supplemental enhancement information (SEI) or other similar metadata carriers available in video bitstreams (e.g., in the enhancement layers) as metadata 142. Such metadata may include, but are not limited to, information as: color space or gamut information, dynamic range information, tone mapping information, or other predictor, up-scaling, and quantizer operators, such as those described herein.

After generating all parts of the layered HDR stream, the coded EL stream (172), the coded BL stream (122), and related metadata (142) are multiplexed and packetized so that they can be stored in a storage medium and/or be transmitted to a decoder.

In a dual layer system, such as the one depicted in FIG. 1, the major function of the enhancement layer is to compensate for the missing information from the base layer. The bit reduction to generate the base layer, in combination with the characteristics of SMPTE 2084 or gamma coding, may result in coding artifacts, such as banding, blocking, or color bleeding, even when an enhancement layer is being employed. The methods proposed herein, assume a simple LSB truncation in HDR to HDR10 conversion; however, as will be appreciated by people skilled in the art, these techniques are applicable to all dual-layer coding schemes, regardless of how the base layer is being generated.

The term "PQ" as used herein refers to perceptual quantization. The human visual system responds to increasing light levels in a very non-linear way. A human's ability to see a stimulus is affected by the luminance of that stimulus, the size of the stimulus, the spatial frequency(ies) making up the stimulus, and the luminance level that the eyes have adapted to at the particular moment one is viewing the stimulus. In a preferred embodiment, a perceptual quantizer function maps linear input gray levels to output gray levels that better match the contrast sensitivity thresholds in the human visual system. An example of a PQ mapping function is given in the SMPTE ST 2084 specification, where given a fixed stimulus size, for every luminance level (i.e., the stimulus level), a minimum visible contrast step at that luminance level is selected according to the most sensitive adaptation level and the most sensitive spatial frequency (according to HVS models). Compared to the traditional gamma curve, which represents the response curve of a physical cathode ray tube (CRT) device and coincidently may have a very rough similarity to the way the human visual system responds, a PQ curve, as described in SMPTE ST 2084, imitates the true visual response of the human visual system using a relatively simple functional model.

It has been observed that PQ coding assigns more codewords in the dark areas than in highlights. As a result, during low bit rate coding there is an increased occurrence of banding and blocking artifacts or color bleeding in the highlights. It is a goal if this invention to provide methods to reduce such coding artifacts.

In a method described herein, the visual quality of the output is enhanced by using a piecewise linear predictor as the predictor (140). In an embodiment, such a predictor operates as follows: a) when the slope of the predictor is closer to zero (or flatter), the magnitude of the residual (152) is larger; however, it represents more of an image-like image, hence it is easier to encode with the EL encoder (170). b) When the slope of the predictor is closer to one (or steeper), the residual has a smaller magnitude; however, it is more noise-like, hence much harder to compress. By adjusting the slope of the predictor in a piecewise-linear manner, and by masking the residual image (152), one can control the amount of residual to be coded in the EL layer and thus improve overall quality while maintaining a low bit rate for the enhancement layer. The proposed method is fully compliant with existing Dolby Vision decoders which support piecewise-linear or non-linear prediction during decoding.

Figure 2:
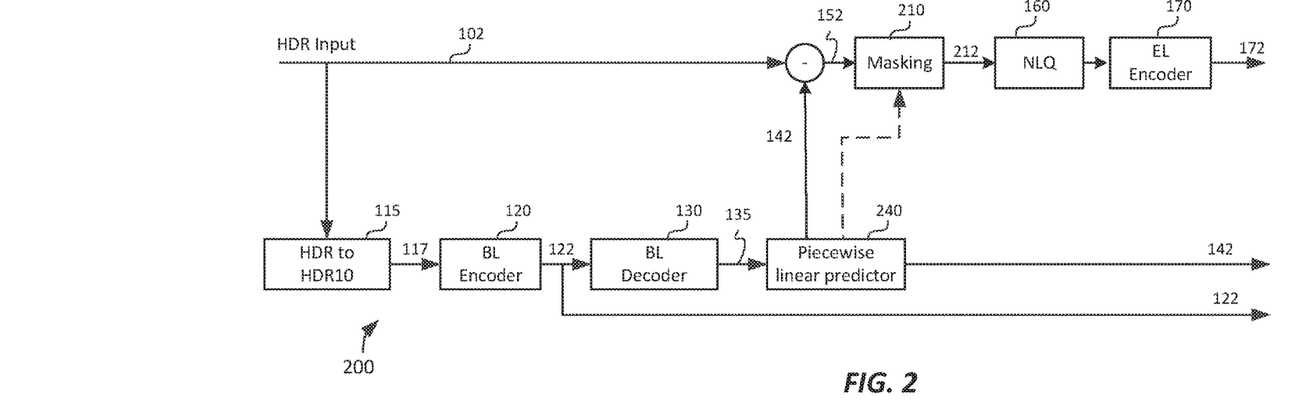
FIG. 2 depicts an example process for the coding and video delivery of HDR video according to an embodiment of this invention.

FIG. 2 depicts an example of an encoder for the coding and distribution of HDR content according to an embodiment. Compared to FIG. 1, predictor (240) is now a piecewise-liner predictor. The slopes of the segments in the predictor (240) are used to mask the residual (152) in masking unit (210). The details for generating the prediction function (240) and the masking unit (210) are described next.

Piecewise-Linear Prediction

Figure 3:
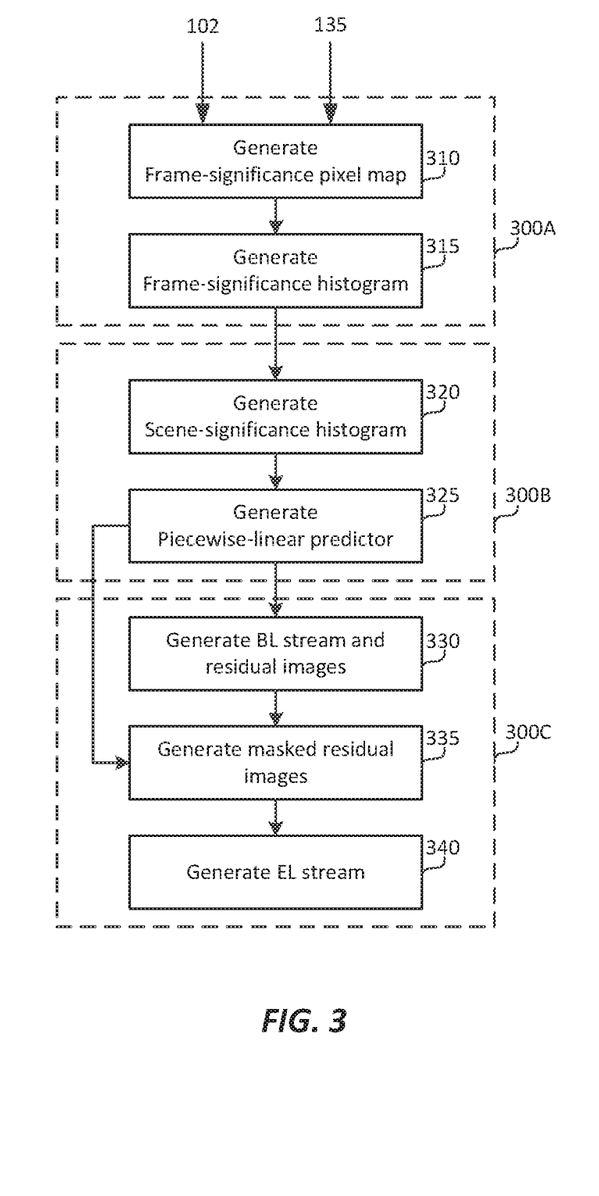
FIG. 3 depicts an example process for coding a sequence of HDR images using a piecewise liner inter-layer predictor according to an embodiment of this invention.

FIG. 3 depicts an example process for generating a piecewise linear predictor and generating a dual-layer HDR coded stream according to an embodiment. As depicted in FIG. 3, the process can be divided into three stages. In stage 1 (300A), for each frame in a scene, first, a frame-significance map denoting the areas of interest to be coded in the EL is constructed (310). From this map, a frame-significance histogram is constructed (315). This histogram denotes the significance value for every luminance codeword. In stage 2 (300B), processing is performed at the scene level. In step (320), a scene-significance histogram is generated based on all the frame-significance histograms for the entire scene. In step (325), this scene-based significance histogram is used to generate the piecewise linear predictor so that small slopes (closer to 0) are assigned to pixels with large values in the scene-significance histogram and larger slopes (closer to 1) are assigned to pixels with low values in the scene-significance histogram. Finally, in stage 3 (300C), given the predictor generated in step 325, each frame in the scene is encoded to generate a coded BL stream (122) and a coded EL stream (172). Step (330) generates the BL coded pictures and the corresponding residual pictures (152). In step (335), input from the prediction generation step (325) is used to mask the residual images and generate masked residual images. Finally, in step (340), an EL stream (172) is generated based on the masked residual images of step (335).

Frame-Significance Pixel Map

Given the j-th frame (or picture) in a sequence of frames in the input HDR stream (102), let $v_{ji}$ denote the i-th pixel and let $\hat{v}_{ji}$ denote the corresponding decoded pixel in the output (135) of the BL decoder (130). In an embodiment, without loss of generality, all pixel values may be normalized to be between [0 1). Denote the bit depth in the base layer (BL) as b (e.g., b=10), then the total number of codewords in the BL is $B=2^n$ and each un-normalized codeword value is between [0, B−1].

As used herein, the term 'frame-significance pixel map', or 'frame-significance map' denotes a map (or list) of those pixels in a frame where according to some criterion there is high probability to observe errors due to the HDR to HDR10 truncation. In an embodiment, without limitation, a frame-significance map is generated using entropy filtering. Entropy filter measures the local entropy for each pixel from its own neighborhood. For any pixel with location x in an image, let the neighborhood of x be denoted as N(x), then the local entropy for pixel x is computed as $$q(x) = \sum_{i=0}^{B-1} p_i(x) * \log\left(\frac{1}{p_i(x)}\right), \quad (1)$$

where $p_i(x)$ represents the probability of intensity value i in N(x) and can be defined as $$p_i(x) = \frac{|\{y = i \mid y \in N(x)\}|}{|N(x)|}, \quad (2)$$

i.e. the number of pixels in the set N(x) having the intensity value i divided by the number of pixels in the set N(x).

In an embodiment, for a K x K neighborhood, K=(2*m+1), where m=ceil(0.125% of the vertical resolution of the image). For example, for 1080p images, K=5.

Let $$\delta^H_{ji} = |q(v_{ji}) - q(\hat{v}_{ji})| \quad (3)$$

denote the "entropy difference" after performing entropy filtering to both the original and the decoded picture. One may apply equation (3) directly to generate the frame-significance map; however, due to quantization errors, equation (3), occasionally may lead to identifying the wrong picture regions. It has been observed that coding errors typically are more observable in bright regions. This observation coincides also with the fact that the PQ curve allocates fewer codewords for the brighter regions. Thus, in a preferred embodiment, a significance map should take into consideration the luminance of the input HDR picture as well. As an example, the significance map may be given by $$I^{s'}_{ji} = \delta^H_{ji} * v_{ij} * c, \quad (4)$$

where c denotes a weighting factor (e.g., c=1. or c=0.85).

In an embodiment, equation (4) may be further normalized to output values between [0, 1], e.g. as in $$I^{s''}_{ji} = \frac{I^{s'}_{ji}}{\max(\max(I^{s'}_{ji}), \Delta)}, \quad (5)$$

where $\Delta$ is a safety margin to prevent dividing by zero (e.g. $\Delta=0.00000001$). Taking into consideration the bit rate restrictions for coding the enhancement layer, given a threshold $T_s$ (e.g., for b=10, $T_S$=0.1), a final frame-significance map may be computed as $$I^s_{ji} = (I^{s''}_{ji} > T_s ? I^{s''}_{ji} : 0). \quad (6)$$

In other words, if $I^{s''}_{ji} > T_S$, then $I^s_{ji} = I^{s''}_{ji}$, and otherwise $I^s_{ji} = 0$.

Frame-Significance and Scene-Significance Histograms

As depicted in FIG. 3, after determining in step (310) the frame-significance map, say, using equation (6), the next step (315) is to generate a frame-significance histogram. In an embodiment, this may be computed as $$h_j(k) = \sum_{i \in \Phi_{jk}} I^s_{ji}, \text{ for } k = 0, \ldots, B-1, \quad (7)$$

where $\Phi_{jk} = \{i \mid \hat{v}_{ji} = k\}$ denotes the set of pixels in the decoded frame j with values equal to k. Bins with large $h_j(k)$ values represent luminance ranges which are more likely going to exhibit higher distortions and artifacts.

Scene-Significance Histogram

As used herein, the terms 'scene' or 'shot' denote a series of sequential-in-capture frames that may share the same overall brightness characteristics. Given a scene (say, l) with N frames, and given the frame-significance histograms for each frame, in an embodiment, a scene-based significance histogram may be determined as a weighted average of the frame-significance histograms. For example, if all weights are equal to 1/N, then $$\overline{h}_l(k) = \frac{\sum_{j=0}^{N-1} h_j(k)}{N}, \text{ for } k = 0, \ldots, B-1. \quad (8)$$

In some embodiments, instead of computing equation (8) for all frames in the scene, to reduce the computational load, one may simply compute the weighted average based on a smaller subset of frames in the scene (e.g., every n-th frame, and the like).

Constructing a Piecewise-Linear Predictor

In some embodiments, before generating the linear predictor, it may benefit to filter the scene-significance histogram to make it more robust under noise. For example, without limitation, one may use a median filter, or a low-pass filter. Since, most of the errors are in the highlights, one may also filter only those values that are higher than a threshold $T_h$ (e.g., for b=10, $T_h$=400). As an example, given a window size $W_m$ (e.g., $W_m$=7), the filtered scene-significance histogram may be generated as $$\tilde{h}_l(k) = \text{median}(\{\overline{h}_l'(k+m) \mid m \in [-(W_m-1)/2, (W_m-1)/2]\}),$$
$$\text{for } k > T_h. \quad (9)$$

Figure 4:
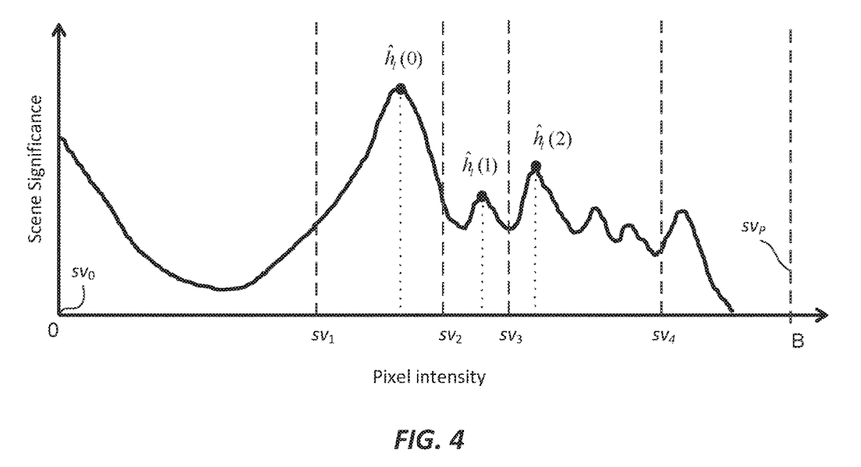
FIG. 4 depicts an example scene-significance histogram function and associated pivot points for an inter-layer predictor according to an embodiment of this invention.

FIG. 4 depicts an example of a typical smoothed scene-significance histogram. Let $\hat{h}_l = \{\hat{h}_l(0), \hat{h}_l(1), \ldots, \hat{h}_l(M-1)\}$ denote the set of the M highest peaks, counted after k>$T_h$, where $\hat{h}_l(p)$ represents the location of the p-th peak in the original order. This set can be generated by sorting all peak locations and selecting the first M-1 values. In an embodiment, the final peak position, $\hat{h}_l(M-1)$, is manually added to be the maximum codeword value at B-1. Let P denote the maximum number of segments determining the piecewise linear predictor, then the maximum number of pivot points is P+1. Let the starting pivot point to be at 0 and the final pivot point to be at B-1. In an embodiment, the second pivot point is selected at the EL threshold, $T_h$. The rest of the pivots are determined as the mid-points between two peaks. Hence, if $sv_l = \{sv_{l,0}, sv_{l,1}, \ldots, sv_{l,P-1}, sv_{l,P}, sv_{l,P+1}\}$ denotes the set of pivot points, then $$sv_{l,0} = 0 \quad (10)$$
$$sv_{l,1} = T_h$$
$$sv_{l,p} = \frac{\hat{h}_l(p-2) + \hat{h}_l(p-1)}{2}, \text{ for } p = 2, 3, \ldots, P,$$
$$sv_{l,P+1} = B - 1.$$

For example, in FIG. 4, pivot point $sv_2$ is positioned in the middle between the peaks $\hat{h}_l(0)$ and $\hat{h}_l(1)$ and pivot point $sv_3$ is positioned in the middle between peaks $\hat{h}_l(1)$ and $\hat{h}_l(2)$. If no peaks are found, for example, because the image is mostly black or because there are no pixels with intensity higher than our threshold, then, one may divide the space evenly. For example, if $$\Delta_h = \left\lfloor \frac{B - T_h}{P - 2} \right\rfloor, \quad (11)$$

then the pivot points are [0, $T_h$, $T_h+\Delta_h$, $T_h+2\Delta_h$, ..., $T_h+(P-1)\Delta_h$, B−1].

Given a set of pivot points, the next step is to determine the slope of each segment. Let $e_l(k)$ denote the slope between pivot points $(sv_{l,k}, sv_{l,k+1})$ for k>0. For k=0 (the segment below the EL threshold), $e_l(0)=1$, otherwise, $e_l(k)$ is computed based on the scene-significance histogram as follows:
Let $$e'_l(k) = \frac{\sum_{t=sv_{l,k}}^{sv_{l,k+1}-1} h_l(t)}{sv_{l,k+1} - sv_{l,k}}, \text{ for } k = [0, \ldots, P], \quad (12a)$$

be a measure of the "energy" of the histogram within the k-th segment.
Let $$e_l^{norm}(k) = \frac{e'_l(k)}{\max\{e'_l(k)\}}, \quad (12b)$$

then $e^{norm}_l(k)$ will be normalized between 0 and 1, and $$e''_l(k) = \frac{1}{e_l^{norm}(k)+1} \quad (12c)$$

will be between 0.5 and 1. Finally, the slope $$e_l(k) = \frac{e''_l(k)}{\max\{e''_l(k)\}}, \quad (12d)$$

as a measure of this energy, will be smaller than 1. Intuitively, smaller slopes (close to zero) are assigned to pixels with large values in the scene-significance histogram and bigger slopes (close to 1) are assigned to pixel values with low values in the significance histogram.

The methodology to restrict the slope to be in (0,1) assumes that both the input (135) and output (142) of the piecewise linear predictor are also normalized to be in (0,1). Hence, for a normalized HDR input (102) in (0,1), the residual (152) will be in (−1, 1) in whatever bit-depth precision is supported by encoder (200). A person skilled in the art will appreciate that this methodology can be easily adapted to support alternative numerical representations of the input and output signals.

Equation (12d) does not take into consideration any bit rate limitations for the enhancement layer. In other words, given slopes defined by equation (12d), the amount of data to be coded in the EL may exceed the available bit rate. Hence, in some embodiments, these slopes may be further adjusted according to bit rate constrains.

Let $\phi$ denote an EL data bit rate limit. As will be discussed later, if the predictor slope $e_l(k)=1$, then those codewords within this segment will be masked (their corresponding residual values will be set to zero) and coded in the base layer only. Hence one way to reduce the EL data rate is to set the slope of a segment to one. In an embodiment, for a given segment k, an approximation of the number of pixels to be coded in the EL may be computed as $$C_{EL}(k) = \sum_{t=sv_{l,k}}^{sv_{l,k+1}-1} \bar{h}_l(t), \text{ for } k = [0, \ldots, P], \quad (13)$$

or $$C_{EL}(k) = e'_l(k) \cdot (sv_{l,k+1} - sv_{l,k}).$$

In an embodiment, the following algorithm may be used to identify which segments may use the original slope $e_l(k)$ and which segments may need to have their slope adjusted. Let $\hat{e}_l(t)$, t=0, 1, ..., P, denote the sorted slopes (where $\hat{e}_l(0)$ is the smallest) and let G( ) be a mapping function between the unsorted and sorted values, or $\hat{e}_l(t)=e_l(G(t))$. Let $\hat{\varepsilon}$ denote the maximum number of segments for which the maximum bitrate constraint for the enhancement layer is still satisfied, or $$S = \sum_{t=0}^{\varepsilon} C_{EL}(G(t)) < \phi, \quad (14)$$

or $$\hat{\varepsilon} = \underset{\varepsilon}{\operatorname{argmax}} \sum_{t=0}^{\varepsilon} C_{EL}(G(t)) < \phi. \quad (15)$$

Then the final slope $M_l(k)$ for the k-th segment is determined as follows $$M_l(k) = \begin{cases} e_k(k) & \forall k \mid G(k) < \hat{\varepsilon} \\ 1 & \text{else} \end{cases}. \quad (16)$$

Figure 5:
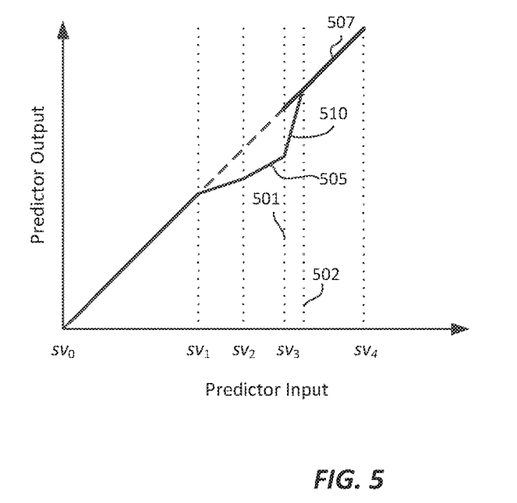
FIG. 5 depicts an example piece-wise linear prediction function according to an embodiment of this invention.

As depicted in FIG. 5, in many cases, applying equation (16) directly may generate segments with slope 1 in between segments with a slope lower than 1, which results in a discontinuous prediction function. For example, segment (505) between pivots $sv_2$ and $sv_3$ has a slope lower than 1. Assume now that the slope of segment 507, between $sv_3$ and $sv_4$, needs to be 1 because the bit rate criterion of equation (14) can't be satisfied for this segment. This will force a discontinuity in pivot point $sv_3$. In some embodiments, it may be beneficial to maintain continuity between segments and thus connect those segments with a segment of fixed slope sl>1, e.g., sl=1.2. This allows for a smoother transition between pixel values in the enhancement layer residual images, and thus improved coding efficiency in the EL stream. For example, as depicted in FIG. 5, one may insert now a new pivot point (502) between pivot points $sv_3$ and $sv_4$, joined by new segment (510) of fixed slope (sl).

In embodiments where there is a hard constrain on the maximum number of segments (P), it can be shown that the maximum number of peaks (M) that need to be detected in the scene-significance histogram is bounded by $$M \le \frac{(P-2)2}{3}. \quad (17)$$

For example, if the maximum number of segments is P=8 (9 pivots), then M=4. Equation (17) allows for the worst case scenario, where a new pivot (e.g., 502) needs to be inserted on every alternate segment generated using the original set of M peaks.

Let pred(i) denote the output of the piecewise linear predictor for an input $i \in (0, B-1)$. Given the pivot points and slopes $M_l(k)$ computed earlier, Table 1 summarizes in pseudocode an example embodiment to generate the prediction function.

TABLE 1

Example function to generate a piecewise linear prediction function

```
INITIALIZE
pred(i) = 1 ∀i∈ (0,2^B -1)
UPDATE:
∀i∈ (1,2^B -1) , if( sv_{l,k} ≤ i < sv_{l,k+1})
{
    m = M_l (k)
    if(m == 1)
    {
        if{ ( i - pred(i-1) ) < 1 }
        {
            pred(i) = i // continuity exists, slope remains 1
        }
        else
        {
            pred(i) = pred(i-1)+sl // Adjust slope to force continuity
(e.g.,sl=1.2)
            insert_pivot( );
        }
    }
    else
    {
        pred(i) = pred(i-1) + M_l(k) // Use computed slope
    }
}
```

Given the prediction function pred(i), the masking function (210) may be expressed as follows:

$$E_{ij} = \begin{cases} v_{ij} - pred(\hat{v}_{ij}) & \forall\ pred(i) \neq i \\ 0 & \forall\ pred(i) = i \end{cases}, \quad (18)$$

This masking function eliminates from the enhancement layer all predicted values that were computed using an effective slope of 1.

Alternatively, given residual (152), denoted as $r_{ij}=v_{ij}-pred(\hat{v}_{ij})$, $$E_{ij} = \begin{cases} r_{ij} & \text{if predictor slope for } \hat{v}_{ij} \neq 1 \\ 0 & \text{if predictor slope for } \hat{v}_{ij} = 1 \end{cases}.$$

The characteristics of the generated predictor can be communicated to the receiver as a piecewise linear or non-linear prediction function (e.g., using first order or second-order polynomials).

The predictor function generated by the method according to embodiments described herein may be used for processing one or more of the color components of the video data, preferably for each color component of the video data. For example, the predictor function may be used for processing the luma component of video data and/or for processing one or both of the chroma components of the video data. For example, a first predictor function is generated for processing a luma component, while optionally a second predictor function is generated for processing one or both chroma components. In a further example, a first predictor function is generated for processing a luma component, a second predictor function is generated for processing a first chroma component and a third predictor function is generated for processing a second chroma component.

In the preceding discussion, the generation of the piecewise linear predictor is based on generating an average of frame-significance histograms (to be referred to as the scene-significance histogram method). In an alternative embodiment, a predictor can be generated as follows:

a) For every frame in a scene, generate a frame-significance histogram b) Using the same techniques as discussed earlier, generate a frame-based piece-wise linear predictor based on each computed frame-significance histogram c) For the scene, average all the frame-based piece-wise linear predictors to generate a single scene-average predictor. The characteristics of this predictor can be communicated to the receiver as a piecewise linear or non-linear prediction function (e.g., using first order or second-order polynomials)

d) Finally, for each input frame in the scene, apply the scene-average prediction function to create corresponding masked residual images and the EL stream as discussed earlier.

This approach requires far more computations than the scene-significance histogram method and may not be suitable for real-time broadcasting applications.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to video coding and delivery of HDR video, such as those described herein. The computer and/or IC may compute any of a variety of parameters or values that relate to video coding and delivery of HDR video processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to video coding and delivery of HDR video as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Example embodiments that relate to the efficient video coding and delivery of HDR video are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Various aspects of the present invention may be appreciated from the following enumerated example embodiments (EEESs):

EEE 1. A method to design a piecewise-linear prediction function, the method comprising:
  accessing with a processor a first group of images (102) in a first bit depth;
  accessing with the processor a second group of corresponding images (135) in a second bit depth, wherein the second bit depth is lower than the first bit depth and the first group and second group of images represent the same scene;
    for at least one image in the second group:
      filtering the image in the second group to generate a first filtered image;
      filtering the corresponding image in the first group to generate a second filtered image;
      computing (310) a frame-significance pixel map based on the first and second filtered images; and
      computing (315) a frame-significance histogram based on the frame significance pixel map;
    generating a scene-significance histogram (320) based on the one or more computed frame-significance histograms for the images in the second group;
    determining pivot points of a piecewise linear prediction function based on a highlights threshold and peak locations of the scene-significance histogram; and
    determining slopes for each segment of the piecewise linear prediction function based on the scene-significance histogram, wherein a slope for a segment in the piecewise linear prediction function is inversely proportional to a measure of energy in the segment under the scene-significance histogram.

EEE 2. The method of EEE 1, wherein the first bit depth is 12 bits or higher and the second bit depth is 10 bits.

EEE 3. The method of EEE 2, wherein given an image in the first group of images, the corresponding image in the second group images is generated by selecting the 10 most significant bits in each pixel component of the image in the first group.

EEE 4. The method of EEE 1, wherein the first filtered image and the second filtered image are computed using an entropy filter.

EEE 5. The method of EEE 1, wherein the frame significance pixel map value for a pixel in an image in the second group is computed based on the absolute difference between corresponding pixel values in the first and second filtered images, multiplied by a luminance value for a corresponding pixel in the corresponding image in the first group.

EEE 6. The method of EEE 1, wherein the scene-significance histogram is computed as the average of frame-significance histograms computed for one or more images in the second group.

EEE 7. The method of EEE 1, wherein determining the pivot points of the piecewise linear prediction function comprises:
  determining two or more selected peak locations based on the scene-significance histogram; and
  selecting a pivot point as the mid-point between two consecutive selected peak locations.

EEE 8. The method of EEE 7, wherein determining two or more selected peak locations comprises:
  filtering the scene-significance histogram to generate a filtered histogram;
  identifying one or more peaks in the filtered histogram after the highlights threshold; and
  determining as the selected peak locations the M highest peaks among the identified one or more peaks.

EEE 9. The method of EEE 7, further comprising:
  determining as the first pivot point of the piecewise linear prediction function as the pixel value 0;
  determining as the second point of the piecewise linear prediction function as the pixel value equal to the highlights threshold; and
  determining as the last pivot point of the piecewise linear prediction function as the pixel value $2^b-1$, wherein b denotes the second bit-depth.

EEE 10. The method of EEE 1, wherein the measure of energy in a segment is computed based on the sum of scene-significance histogram values in the segment divided by the length of the segment.

EEE 11. The method of EEE 1, further comprising:
  for each image in the second group of images:
    applying the piecewise linear prediction function to the image to generate a predicted image;
    generating a residual image based on the predicted image and the corresponding image in the first group of images;
    applying a masking function to the residual image to generate an enhancement layer image, wherein the masking function is based on the slopes of the segments in the linear prediction function; and
    compressing the enhancement layer image to generate a coded enhancement layer signal.

EEE 12. The method of EEE 11, wherein applying the masking function comprises:
  for each pixel value in the residual image:
    determining whether the slope of the segment to generate the corresponding pixel in the predicted image is one; and
    if the slope is one, setting the pixel in the residual image as zero.

EEE 13. The method of EEE 1, further comprising:
  computing for each segment in the piecewise linear function a measure of bit rate in an enhancement layer based on the scene-significance histogram; and
  determining the slope for each segment based on a bit-rate limit, the measure of bit rate in the segment, and the measure of energy in the segment.

EEE 14. The method of EEE 13, wherein the measure of bit rate for a segment is computed based on the sum of scene-significance histogram values within the segment.

EEE 15. An apparatus comprising a processor and configured to perform any one of the methods recited in EEEs 1-14.

EEE 16. A non-transitory computer-readable storage medium having stored thereon computer-executable instruction for executing a method with one or more processors in accordance with any one of the EEEs 1-14.

What is claimed is:

1. A method of generating a piecewise-linear inter-layer prediction function for bit-depth scalable coding of high dynamic range video data, the method comprising:
   accessing with a processor a first group of images in a first bit depth;
   accessing with the processor a second group of corresponding images in a second bit depth, wherein the second bit depth is lower than the first bit depth and the first group and second group of images represent the same scene;
   for at least one image in the second group:
      filtering the image in the second group to generate a first filtered image;
      filtering the corresponding image in the first group to generate a second filtered image;
      computing a frame-significance pixel map based on the first and second filtered images, wherein the frame significance pixel map value for a pixel in an image in the second group is computed based on the absolute difference between corresponding pixel values in the first and second filtered images, multiplied by a luminance value for a corresponding pixel in the corresponding image in the first group; and
      computing a frame-significance histogram based on the frame significance pixel map;
   generating a scene-significance histogram based on the one or more computed frame-significance histograms for the images in the second group; and
   determining slopes segments of a piecewise linear inter-layer prediction function based on the scene-significance histogram, wherein a slope for a segment in the piecewise-linear inter-layer prediction function is inversely proportional to a measure of energy in the segment under the scene-significance histogram, the measure of energy being computed based on the sum of scene-significance histogram values in the segment.

2. The method of claim 1, wherein the first bit depth is 12 bits or higher and/or the second bit depth is 10 bits.

3. The method of claim 2, wherein given an image in the first group of images, the corresponding image in the second group of images is generated by selecting the 10 most significant bits in each pixel component of the image in the first group.

4. The method of claim 1, wherein the first filtered image and the second filtered image are computed using an entropy filter.

5. The method of claim 1, wherein the scene-significance histogram is computed as the average of frame-significance histograms computed for one or more images in the second group.

6. The method of claim 1, comprising
   determining pivot points of the piecewise-linear inter-layer prediction function based on a highlights threshold and peak locations of the scene-significance histogram.

7. The method of claim 6, wherein determining the pivot points of the piecewise-linear inter-layer prediction function comprises:
   determining two or more selected peak locations based on the scene-significance histogram; and
   selecting a pivot point as the mid-point between two consecutive selected peak locations.

8. The method of claim 7, wherein determining two or more selected peak locations comprises:
   filtering the scene-significance histogram to generate a filtered histogram;
   identifying one or more peaks in the filtered histogram after the highlights threshold; and
   determining as the selected peak locations the M highest peaks among the identified one or more peaks.

9. The method of claim 7, further comprising:
   determining the first pivot point of the piecewise-linear inter-layer prediction function as the pixel value 0;
   determining the second point of the piecewise-linear inter-layer prediction function as the pixel value equal to the highlights threshold; and
   determining the last pivot point of the piecewise-linear inter-layer prediction function as the pixel value $2^b-1$, wherein b denotes the second bit-depth.

10. The method of claim 1, wherein the measure of energy in a segment is computed based on the sum of scene-significance histogram values in the segment divided by the length of the segment.

11. The method of claim 1, further comprising:
    computing for each segment in the piecewise-linear function a measure of bit rate in an enhancement layer based on the scene-significance histogram; and
    determining the slope for each segment based on a bit-rate limit, the measure of bit rate in the segment, and the measure of energy in the segment.

12. The method of claim 11, wherein the measure of bit rate for a segment is computed based on the sum of scene-significance histogram values within the segment.

13. Method for encoding a high dynamic range video data, comprising:
    generating the piecewise-linear inter-layer prediction function according to the method recited in claim 1.

14. Method according to claim 13, comprising:
    for each image in the second group of images:
       applying the piecewise-linear inter-layer prediction function to the image to generate a predicted image;
       generating a residual image based on the predicted image and the corresponding image in the first group of images;
       applying a masking function to the residual image to generate an enhancement layer image, wherein the masking function is based on the slopes of the segments in the piecewise-linear inter-layer prediction function; and
       compressing the enhancement layer image to generate a coded enhancement layer signal.

15. The method of claim 14, wherein applying the masking function comprises:
    for each pixel value in the residual image:
       determining whether the slope of the segment to generate the corresponding pixel in the predicted image is one; and
       if the slope is one, setting the pixel in the residual image as zero.

16. An apparatus comprising a processor and configured to perform the method recited in claim 1.

17. An encoder configured to perform the method recited in claim 1.

18. A non-transitory computer-readable storage medium having stored thereon computer-executable instructions for executing a method with one or more processors in accordance with claim 1.

19. A bitstream comprising high dynamic range video data scalable encoded in accordance with the method of claim 1.

20. A decoder comprising a buffer comprising the bitstream of scalable encoded video data in accordance with claim 19.

* * * * *